(12) United States Patent
Wormald et al.

(10) Patent No.: US 11,219,170 B2
(45) Date of Patent: Jan. 11, 2022

(54) SHELTERS FOR PLANTS

(71) Applicant: Berry Global, Inc., Evansville, IN (US)

(72) Inventors: Paul Stuart Wormald, Maldon (GB); Andrew Mark McCarthy, Newport (GB); Timothy Oliver, Brimscombe Stroud (GB)

(73) Assignee: Berry Global, Inc., Evansville, IN (US)

( * ) Notice: Subject to any disclaimer, the term of this patent is extended or adjusted under 35 U.S.C. 154(b) by 183 days.

(21) Appl. No.: 16/228,434

(22) Filed: Dec. 20, 2018

(65) Prior Publication Data

US 2019/0183070 A1 Jun. 20, 2019

Related U.S. Application Data

(60) Provisional application No. 62/608,223, filed on Dec. 20, 2017.

(51) Int. Cl.
*A01G 13/02* (2006.01)

(52) U.S. Cl.
CPC ..... *A01G 13/0243* (2013.01); *A01G 13/0237* (2013.01)

(58) Field of Classification Search
CPC ............ A01G 13/0243; A01G 13/0237; A01G 7/045; A01G 5/04; A01G 5/06; A01G 9/1438; A01G 33/00; A01G 9/20; A01G 13/0275; A01G 9/02; A01G 9/22; A01G 13/0268; A01G 27/006; A01G 27/04; A01G 31/02; A01G 9/243; A01G 9/26; A01G 9/021; A01G 9/0291; A01G 9/246; A01G 13/00; A01G 13/0256; A01G 13/10; A01G 2009/1461; A01G 20/20; A01G 22/00; A01G 7/00; A01G 9/14; A01G 9/1407; A01G 9/247; A01G 13/0206; A01G 13/105; A01G 2009/1446; A01G 2009/1453; A01G 20/10; A01G 22/05; A01G 24/35; A01G 25/02; A01G 7/06; A01G 9/1415; A01G 9/28
See application file for complete search history.

(56) References Cited

U.S. PATENT DOCUMENTS 4,899,486 A * 2/1990 Hurlstone .............. A01G 13/10
 47/30
5,060,416 A 10/1991 Rohde
(Continued)

FOREIGN PATENT DOCUMENTS

AU 199745450 B2 9/1998
EP 2633753 A1 9/2013
(Continued)

*Primary Examiner* — Timothy D Collins
*Assistant Examiner* — Brittany A Lowery
(74) *Attorney, Agent, or Firm* — Burr & Forman LLP

(57) ABSTRACT

Shelters for enhancing the growth of trees by protecting tree trunks from damaging sunlight. The shelters include a longitudinal tubular structure having a top edge and a bottom edge. The shelters includes a conduit extending from the top edge to the bottom edge of the shelter. The longitudinal tubular structure may be formed from a polymeric material including a pigment selected to block at least a portion of electromagnetic radiation. The polymeric material including the pigment blocks at least about 30% of electromagnetic radiation at any wavelength from about 200 nm to about 2500 nm.

17 Claims, 4 Drawing Sheets

(56) References Cited

U.S. PATENT DOCUMENTS

| | | | |
|---|---|---|---|
| 5,970,653 A | 10/1999 | Liang et al. | |
| 6,108,970 A | 8/2000 | Ball | |
| 6,138,404 A * | 10/2000 | King | A01G 13/0243 47/30 |
| 7,762,019 B2 * | 7/2010 | Rensburg | A01G 9/1438 47/29.1 |
| 8,745,920 B1 | 6/2014 | Mills | |
| 2005/0172549 A1 * | 8/2005 | Allen | A01G 13/0237 47/32.4 |
| 2007/0266626 A1 | 11/2007 | Dworzan | |
| 2009/0272031 A1 * | 11/2009 | Lais | A01G 13/0243 47/29.1 |
| 2010/0299993 A1 | 12/2010 | Lais et al. | |
| 2011/0258923 A1 | 10/2011 | Lais et al. | |
| 2012/0090229 A1 * | 4/2012 | Toye | A01G 13/0206 47/31 |
| 2014/0215909 A1 * | 8/2014 | Hoff | A01G 13/0243 47/48.5 |
| 2014/0305041 A1 | 10/2014 | Moss | |
| 2016/0353677 A1 * | 12/2016 | Toye | A01G 13/0225 |
| 2017/0099786 A1 * | 4/2017 | Latten | A01G 22/00 |

FOREIGN PATENT DOCUMENTS

| | | | |
|---|---|---|---|
| FR | 2785498 A1 | 5/2000 | |
| GB | 2191075 A * | 12/1987 | A01G 13/0243 |
| GB | 2191075 A | 12/1987 | |
| GB | 2388762 A | 11/2003 | |
| GB | 2484989 A | 2/2012 | |
| WO | 1987001904 A1 | 4/1987 | |
| WO | 1995024117 A1 | 9/1995 | |
| WO | 2013067583 A1 | 5/2013 | |
| WO | 2014142714 A1 | 9/2014 | |

* cited by examiner

SHELTERS FOR PLANTS

CROSS-REFERENCE TO RELATED APPLICATIONS

This application claims priority under 35 U.S.C. § 119(e) to U.S. Provisional Application No. 62/608,223, filed Dec. 20, 2017, which is expressly incorporated by reference herein in its entirety.

TECHNICAL FIELD

The presently-disclosed invention relates generally to plant shelters (e.g., self-wrapping twin-walled plant shelter) that protect tree trunks from damaging sunlight.

BACKGROUND

Tree and plant shelters are known in the art and typically comprise a basic plastic structure configured to surround the tree or the plant to allow the tree or plant to grow without being disturbed by harsh environmental elements or become disturbed by animals. Young trees, for instance, need time to become strong and robust. Traditionally, tree trunks have been painted to provide some protection to minimize insect damage, sunscald and cracked, damaged bark. In particular, the chief reason for painting of tree trunks has been to prevent cracking and splitting of the tender new bark due to prolonged exposure to direct sunlight (e.g., overheating of the tree bark), which can allow introduction of disease, insects, and fungus.

Painting the trunks of young trees, however, requires the proper type of paint (e.g., a water-based latex paint) to prevent inadvertently damaging the young tree. Moreover, the use of a water-based latex paint must also be appropriately diluted with water to provide adequate protection without damaging the young tree. Still further, this approach also requires surface preparation as well as laborious applications over the productive lifetime of the tree.

Therefore, there remains a need in the art for plant shelters that provide protection to young plants (e.g., trees) from excessive sunlight that can negatively impact the growth of the young plants and undesirably facilitate introduction of diseases.

SUMMARY OF INVENTION

One or more embodiments of the invention may address one or more of the aforementioned problems. Certain embodiments, according to the invention, provide a plant shelter (e.g., a self-wrapping plant shelter) including a longitudinal tubular structure having a top edge and a bottom edge, in which the longitudinal tubular structure comprises a polymeric material including a pigment (e.g., one or more pigments selected to absorb and/or reflect one or more bands of electromagnetic radiation). In accordance with certain embodiments of the invention, the plant shelter includes a conduit when in a wrapped state or form that may extend from the top edge to the bottom edge of the plant shelter. In this regard, for example, a trunk of a plant may pass through the entirety of the length of the plant shelter via the conduit. In accordance with certain embodiments of the invention, the plant shelter may comprise a self-wrapping plant shelter (e.g., a twin-walled self-wrapping shelter) that may be laid flat upon pressure and upon removal of pressure the self-wrapping shelter may roll upon itself to define the longitudinal tubular structure that can surround a plant to be protected. Such a plant shelter while wrapped upon itself, for example, may be described as being vertically split to allow the diameter of the tubular structure to expand, such as upon growth of the plant. In accordance with certain embodiments of the invention, the polymeric material including the pigment blocks at least about 30% of electromagnetic radiation at any and/or all wavelengths from about 200 nm to about 2500 nm, such as about 40%, 50%, 60%, 70%, or 80% of electromagnetic radiation at any and/or all wavelengths from about 200 nm to about 2500 nm. In accordance with certain embodiments of the invention, the polymeric material including the pigment reflects at least about 40% of electromagnetic radiation at any and/or all wavelengths from about 390 nm to about 2100 nm, such as about 45%, 50%, 60%, 70%, 80%, or 85% of electromagnetic radiation at any and/or all wavelengths from about 390 nm to about 2100 nm. The polymeric material including the pigment may comprise a generally white color.

In another aspect, the invention provides a method of protecting a plant, such as a young tree. In accordance with certain embodiments of the invention, the method may comprise surrounding the plant or a portion of the plant with a shelter as described herein.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
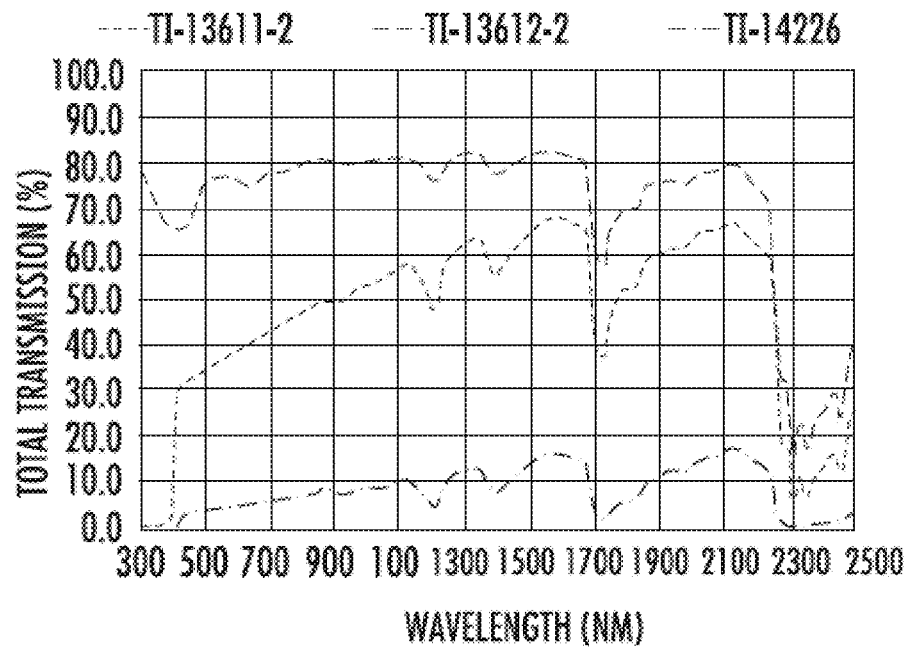
FIG. 1 is a plot of total transmission of light for individual plant shelters.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

It is to be understood, however, that the drawings are designed solely for purposes of illustration and not as a definition of the limits of the invention, for which reference should be made to the appended claims. Any relative dimensions illustrated in the figures are given by way of example and are not intended to be limiting. As would be appreciated by a person having ordinary skill in the art, the relative dimensions can vary depending on any number of factors including, without limitation, the intended use and performance of the illustrated article.

The invention includes, according to certain embodiments, a plant shelter (e.g., self-wrapping twin-walled plant shelter) that protects tree trunks from damaging sunlight. In accordance with certain embodiments of the invention the plant shelters provide protection to young plants (e.g., trees) from damaging sunlight that can negatively impact the growth of the young plants and undesirably facilitate introduction of diseases. Plant shelters, in accordance with certain embodiments of the invention, provide a more cost effective and technically superior approach to protecting young plants (e.g., trees) from sunlight, which can damage the bark of young plants (e.g., trees). Young plants (e.g., trees), for instance are particularly prone to damage from sunlight. In accordance with certain embodiments of the invention, the plant shelter may comprise a wrap-type plant shelter (e, g., self-wrapping plant shelter) that can be quickly applied to a plant (e.g., around the trunk of a tree), particularly in comparison to the time required to paint one or several tree trunks initially and over multiple seasons, and provide prolonged protection (e.g., several seasons) that is not realized by painting. Beneficially, plant shelters in accordance with certain embodiments of the invention overcomes the labor intensive application of paint to young plants both initially and over the course of multiple seasons. That is, plant shelters in accordance with certain embodiments of the invention may be quickly positioned about a young plant (e.g., tree) a single time and sunlight blocking benefits imparted by the plant shelter may be realized for multiple seasons (e.g., 2-10 seasons). For instance, wrap-type plant shelters (e.g., self-wrapping plant shelter), in accordance with certain embodiments of the invention, expand in size with the diameter growth of the trunk during its development, while preventing the surface cracking and/or other damage. Furthermore, certain embodiments of the invention provide improved protection from rodents and potentially other pests (e.g., insects) as compared to painting of plants due, at least in part, to the physical barrier provided about the base of the young plant (e.g., tree). In accordance with certain embodiments of the invention, the plant shelter may comprise an extruded wrap-type plant shelter (e.g., self-wrapping plant shelter) comprising a polyolefin (e.g., polypropylene) polymeric component including at least one white pigment blended in with the polymeric component before or during extrusion.

The terms "substantial" or "substantially" may encompass the whole amount as specified, according to certain embodiments of the invention, or largely but not the whole amount specified according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material.

The term "filler", as used herein, may comprise particles or aggregates of particles and other forms of materials that can be added to a polymeric film blend. According to certain embodiments of the invention, a filler will not substantially chemically interfere with or adversely affect the extruded material. According to certain embodiments of the invention, the filler is capable of being uniformly dispersed throughout the material or a layer comprised in a multilayer composite.

The term "biocomposite", as used herein, may comprise two or more distinct substances having natural and biological origin that are combined to produce a new material with properties not present in either individual material. According to certain embodiments of the invention, biocomposite materials may comprise biopolymers and/or biofibers.

The term "biodegradable", as used herein, may comprise all biocomposite and biopolymeric materials including those composed at least in part of sustainable sources and whose cycle is $CO_2$ neutral, completely slag-free, and are biodegradable at the end of their useful lifetime (e.g., via natural biodecomposition or combustion).

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides a plant shelter (e.g., a self-wrapping plant shelter) including a longitudinal tubular structure having a top edge and a bottom edge, in which the longitudinal tubular structure comprises a polymeric material including a pigment (e.g., one or more pigments selected to absorb and/or reflect one or more bands of electromagnetic radiation). In accordance with certain embodiments of the invention, the plant shelter includes a conduit when in a wrapped state or form that may extend from the top edge to the bottom edge of the plant shelter. In this regard, for example, a trunk of a plant may pass through the entirety of the length of the plant via the conduit. In accordance with certain embodiments of the invention, the plant shelter may comprise a self-wrapping plant shelter (e.g., a twin-walled self-wrapping shelter) that may be laid flat upon pressure and upon removal of pressure the self-wrapping shelter may roll upon itself to define the longitudinal tubular structure that can surround a plant to be protected. Such plant shelters while wrapped upon itself, for example, may be described as being vertically split to allow the diameter of the tubular structure to expand, such as upon growth of the plant.

In accordance with certain embodiments of the invention, the polymeric material including the pigment blocks at least about 30% of electromagnetic radiation at any and/or all wavelength from about 200 nm to about 2500 nm, such as about 40%, 50%, 60%, 70%, or 80% of electromagnetic radiation at any and/or all wavelength from about 200 nm to about 2500 nm. For instance, the polymeric material including the pigment may block at most about any of the following: 90, 85, 80, 75, 70, 65%, 60%, 55%, and 50% of electromagnetic radiation at any and/or all wavelengths from about 200 nm to about 2500 nm and/or at least about any of the following: 30%, 35%, 40%, 45%, 50%, and 55% of electromagnetic radiation at any and/or all wavelengths from about 200 nm to about 2500 nm. Additionally or alternatively, the polymeric material including the pigment blocks from about 80% to about 100%, such as from 90% to 100%, of ultraviolet-B radiation (UV-B), wherein UV-B radiation is electromagnetic radiation across wavelengths 280 nm to 315 nm. Additionally or alternatively, the polymeric material including the pigment blocks at least about 50% of visible light, such as about 60%, 70%, 80%, 90%, or 95% of visible light, wherein visible light is electromagnetic radiation across wavelengths 390 nm to 780 nm.

In accordance with certain embodiments of the invention, the polymeric material including the pigment reflects at least about 40% of electromagnetic radiation at any and/or all wavelengths from about 390 nm to about 2100 nm, such as about 45%, 50%, 60%, 70%, 80%, or 85% of electromagnetic radiation at any and/or all wavelengths from about 390 nm to about 2100 nm. For instance, the polymeric material including the pigment reflects at least about 40% of electromagnetic radiation at any and/or all wavelengths from about 390 nm to about 1100 nm, such as about 45%, 50%, 60%, 70%, 80%, or 85% of electromagnetic radiation at any and/or all wavelengths from about 390 nm to about 1100 nm. For instance, the polymeric material including the pigment may reflect at most about any of the following: 90, 85, 80, 75, 70, 65%, 60%, 55%, and 50% of electromagnetic radiation at any and/or all wavelengths from about 390 nm to about 1100 nm and/or at least about any of the following: 30%, 35%, 40%, 45%, 50%, and 55% of electromagnetic radiation at any and/or all wavelengths from about 390 nm to about 1100 nm. In accordance with certain embodiments of the invention, the plant shelter formed from the polymeric material including the pigment may comprise a percent-reflectance-to-percent-absorption ratio from about 10:1 to about 70:1, such as about 15:1 to about 40:1, or about 15:1 to about 20:1, of electromagnetic radiation at any and/or all wavelengths from about 500 nm to about 1100 nm. For instance, the plant shelter formed from the polymeric material including the pigment may comprise a percent-reflectance-to-percent-absorption ratio of at most about any of the following: 80:1, 75:1, 70:1, 65:1, 60:1, 55:1, 50:1, 45:1, 40:1, and 35:1 of electromagnetic radiation at any and/or all wavelengths from about 500 nm to about 1100 nm and/or at least about any of the following: 10:1, 15:1, 20:1, 25:1, 30:1, 35:1, and 40:1 of electromagnetic radiation at any and/or all wavelengths from about 500 nm to about 1100 nm.

In accordance with certain embodiments of the invention, the pigment may comprise an antimony pigment (e.g., Stibous Oxide ($Sb_2O_3$)), a barium pigment (e.g., barium sulfate ($BaSO_4$), lithopone ($BaSO_4*ZnS$), etc.), a titanium pigment (e.g., titanic dioxide ($TiO_2$)), a lead pigment (e.g., plumbous carbonate (($PbCO_3)_2 \cdot Pb(OH)_2$)), a zinc pigment (e.g., zinc oxide (ZnO)), or any combination thereof. In accordance with certain embodiments of the invention, the polymeric material including one or more of the pigments comprise a white color. In accordance with certain embodiments of the invention, the polymeric material including the pigment may comprise from about 1% by weight of the pigment to about 50% by weight of the pigment based on the weight of the polymeric material. For instance, the polymeric material including the pigment may comprise at most about any of the following: 50%, 45%, 40%, 35%, 30%, 25%, 20%, 15%, 12%, 10%, 9%, 8%, 7%, 6%, and 5% by weight of the pigment based on the weight of the polymeric material and/or at least about any of the following: 0.5%, 1%, 2%, 3%, 4%, 5%, 6%, 7%, 8%, 9%, 10%, 12%, 15%, and 20% by weight of the pigment based on the weight of the polymeric material. In accordance with certain embodiments of the invention, the pigment may be added to the polymeric melt in a variety of ways, such as via addition of a masterbatch composition including the pigment alone or with other additives (e.g., UV stabilizer, etc.) incorporated with a carrier or bridging polymer of the masterbatch.

Figure 2:
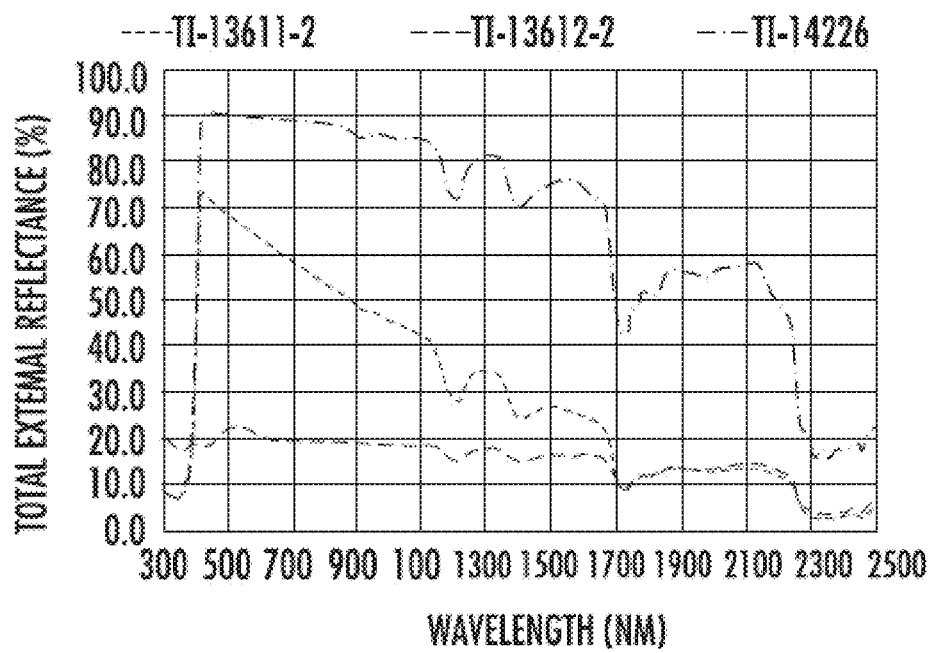
FIG. 2 is a plot of total external reflection of light for individual plant shelters.
Figure 3:
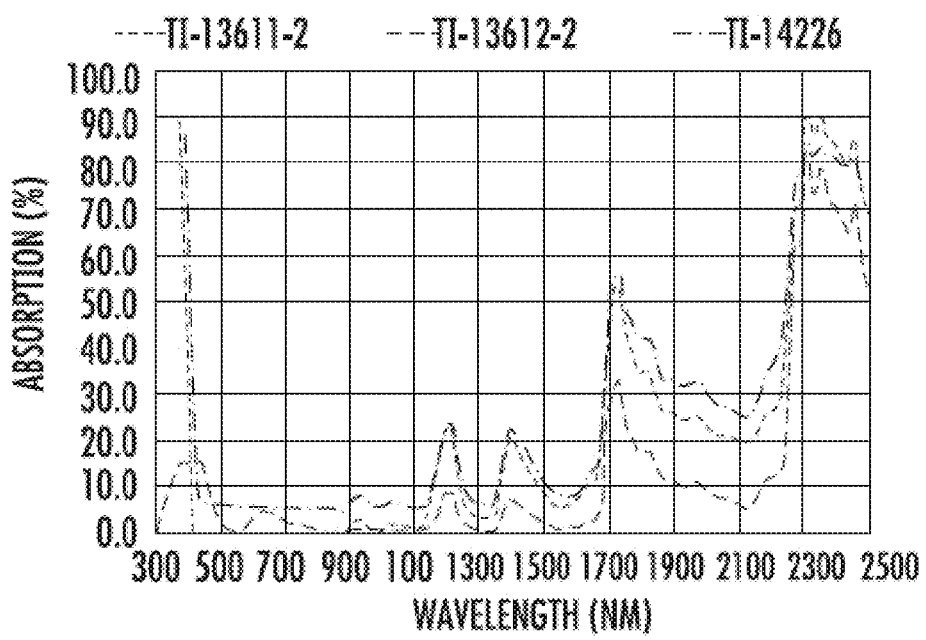
FIG. 3 is a plot of light absorption for individual plant shelters.

FIG. 1 is a plot of total transmission of light for individual plant shelters. FIG. 2 is a plot of total external reflection of light for the same individual plant shelters. FIG. 3 is a plot of light absorption for the same individual plant shelters. In each figure, the data for the plant shelter identified as TI-13611-2 was a white plant shelter including 0.5% by weight of pigment based on the weight of the polymeric material. The data for the plant shelter identified as TI-13612-2 was a traditional green plant shelter. The data for the plant shelter identified as TI-14226 was a white plant shelter including 10% by weight of pigment based on the weight of the polymeric material. As can be seen from FIGS. 1-3, the white plant shelters, in accordance with certain embodiments of the invention, blocked (e.g., low transmission via reflection and/or absorption of electromagnetic radiation) a significant amount of electromagnetic radiation across a wide range of wavelengths. Furthermore, a comparison of FIGS. 2 and 3 illustrate that the percentage of electromagnetic radiation blocked due to reflection far exceeded the amount blocked due to absorption. In accordance with certain embodiments of the invention, the percent-reflectance-to-percent-absorption ratio (as noted above) indicates that most of the electromagnetic radiation for a given wavelength reaching a plant shelter is reflected away from the plant shelter instead of either passing through the plant shelter to the plant being protected or being absorbed by the shelter and potentially increasing the amount of heat and/or temperature around the portion of the plant be protected. In this regard, certain embodiments of the invention may impart a cooler localized environment adjacent the portion of the plant being protected (e.g., protected portion of a tree trunk) during daylight hours and/or slightly warmer localized environment during the night.

Figure 4A:
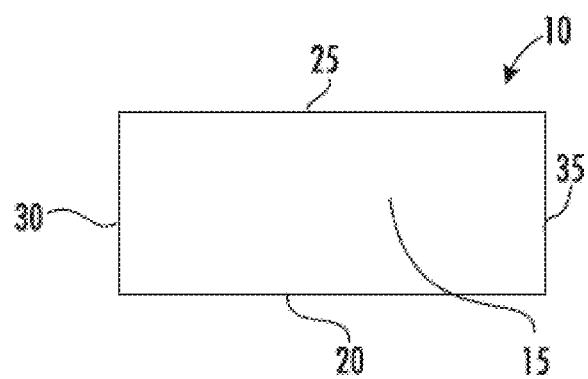
FIG. 4A illustrates a plant shelter in an un-wrapped configuration in accordance with certain embodiments of the invention.
Figure 4B:
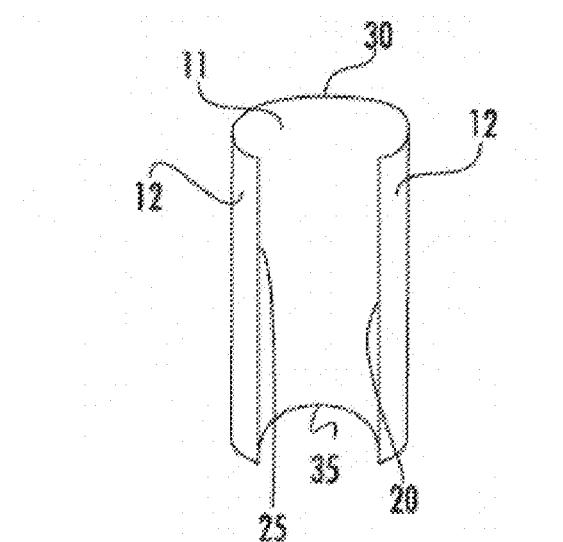
FIG. 4B illustrates the plant shelter of FIG. 4A in an intermediate state where the plant shelter is in the process of self-wrapping upon itself.

In accordance with certain embodiments of the invention, the plant shelter may comprise a wrap-type plant shelters (e.g., self-wrapping plant shelter) that requires an external force to maintain the shelter in a substantially planar or flat configuration and upon removal of the external force roll upon itself to form the longitudinal tubular structure. FIG. 4A, for example, illustrates a wrap-type plant shelters (e.g., self-wrapping plant shelter) that is in an un-wrapped configuration or form (e.g., substantially flat or planar). As shown in FIG. 4A, the plant shelter 10 includes a first-side-edge 20 extending from a top edge 30 to a bottom edge 35 and a second-side edge 25 extending from the top edge 30 to the bottom edge 35. In this regard, the first-side-edge 20, the second-side-edge 25, the top edge 30, and bottom edge 35 may define a body area 15 of the plant shelter. FIG. 4B illustrates the wrap-type plant shelters (e.g., self-wrapping plant shelter) of FIG. 4A while in an intermediate state in which the plant shelter is in the process of self-wrapping (e.g., rolling upon itself). As shown in FIG. 4B, the plant shelter includes a first surface 11 that defines an internal surface of a the formed longitudinal tubular structure and a second surface 12 that defines an external surface that faces away from a plant being surrounded by the plant shelter. In accordance with certain embodiments of the invention, for instance, the longitudinal tubular structure may comprise a self-wrapping structure configured to roll upon itself to define the longitudinal structure in the absence of an external pressure maintaining the plant shelter in a flat or planar configuration.

Figure 5A:
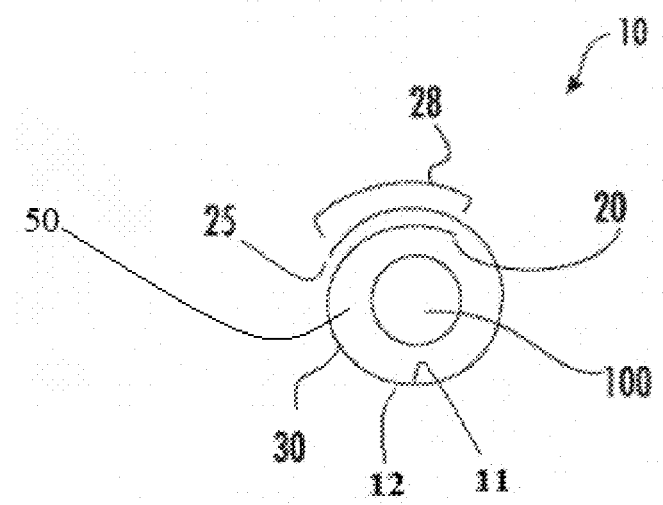
FIG. 5A illustrates a plant shelter (e.g., a self-wrapping shelter) wrapped about a young tree trunk and having a relatively large overlapping section in accordance with certain embodiments of the invention.
Figure 5B:
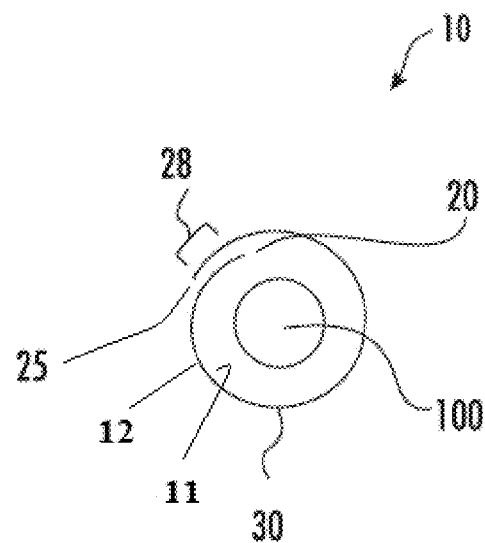
FIG. 5B illustrates the plant shelter (e.g., a self-wrapping shelter) of FIG. 5A after the tree trunk has grown and the plant shelter has a relatively smaller overlapping section due to growth of the tree trunk in accordance with certain embodiments of the invention.

FIG. 5A illustrates a plant shelter 10 (e.g., a self-wrapping shelter) wrapped about a young tree trunk 100, for example shortly after planting, and having a relatively large overlapping section 28 in accordance with certain embodiments of the invention. In this regard, the first-side-edge 20 and the second-side-edge 25 are positioned relative to each other to define an overlapping section 28 of the body area in which a portion of the first surface 11 directly or indirectly overlies a portion of the second surface 12 to define the overlapping section 28. FIGS. 5A and 5B illustrate the relative positioning of the first surface 11 and the second surface 12 at the overlapping section 28 as being indirectly overlying each other merely for ease of illustration of the self-wrapping nature of the plant shelter. As also illustrated in FIG. 5A, the plant shelter 10 defines a conduit 50 extending from the top edge 30 to the bottom edge (not shown in FIG. 5B). FIG. 5B illustrates the plant shelter 10 (e.g., a self-wrapping shelter) of FIG. 5A after the tree trunk 100 has grown and the plant shelter 10 has a relatively smaller overlapping section 28 (as compared to that illustrated in FIG. 5A) due to growth of the tree trunk in accordance with certain embodiments of the invention. In this regard, the plant shelter may comprise a first overlapping section corresponding to an initial time and a second overlapping section corresponding to a second and subsequent time associated with growth of the plant being protected by the plant shelter. In accordance with certain embodiments of the invention, the second overlapping section may be smaller than the first overlapping section. In accordance with certain embodiments of the invention, the first-side-edge 20 and/or the second-side-edge 25 may be free to move relative to each other as illustrated by FIGS. 5A and 5B. In this regard, the first-side-edge 20 and/or the second-side-edge 25 are free to move relative to each other such that upon growth of an encircled plant the overlapping section 28 of the body area reduces in size.

Figure 6:
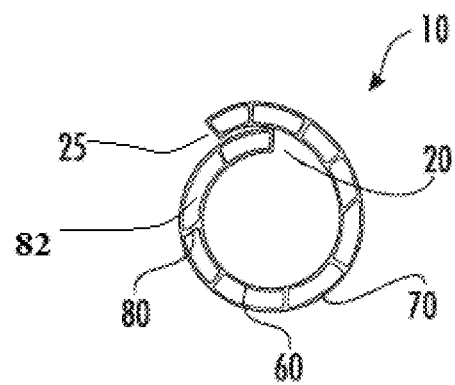
FIG. 6 illustrates a plant shelter (e.g., a self-wrapping shelter) having a twin-walled structure (e.g., an inner wall and an outer wall) in accordance with certain embodiments of the invention.

In accordance with certain embodiments of the invention, the longitudinal tubular structure comprises a twin-walled structure. For example, the plant shelter of FIGS. 5A and 5B may comprise a twin-walled structure. FIG. 6, for instance, illustrates a plant shelter 10 (e.g., a self-wrapping shelter) having a twin-walled structure (e.g., an inner wall 60 and an outer wall 70) in accordance with certain embodiments of the invention. As shown in FIG. 6, the twin-walled structure comprises an outer wall 70, an inner wall 60 positioned within the outer wall 70, and a segmented annular portion positioned between the outer wall and the inner wall, wherein the segmented annular portion comprises a plurality of segmented annular divider walls 80 defining a plurality of through channels 82 extending from the top edge 30 to the bottom edge 35 of the plant shelter. In accordance with certain embodiments of the invention, one or more of the plurality of through channels are configured to receive at least one retaining structure (e.g., stake, peg, etc.) that may be passed through the entirety of the shelter and engage a portion of the ground positioned underneath the plant shelter to provide further support and/or anchoring. Additionally or alternatively, an external strap or band may comprise a flexible and/or elastic material and be positioned about the external surface of the plant shelter to provide additional support without negatively impacting the expandable nature of the plant shelter in accordance with certain embodiments of the invention.

According to certain embodiments of the invention, at least a portion (or all) of the plant shelter may comprise at least one of a synthetic polymer (e.g., a polyolefin), a biodegradable polymer, a biocomposite, or any combination thereof. In certain embodiments of the invention, the synthetic polymer may comprise at least one of a polyethylene, a polypropylene, a partially aromatic polyester, a fully aromatic polyester, a polyhexamethylene diadipamide, a polycaprolactam, an aromatic polyamide, a partially aromatic polyamide, an aliphatic polyamide, or any combination thereof. In certain embodiments of the invention, the biodegradable polymer may comprise at least one of a cellulose, a polylactic acid, a cellophane, a native starch, a thermoplastic starch, a polyhydroxy butyrate, a poly-hydroxybutyrate-co-b-hydroxy valerate, a polyglycolic acid, a polycaprolactone, a compostable bioplastic, a platinum-catalyzed silicone, a reclaimed potato starch resin, or any combination thereof.

According to certain embodiments of the invention, the plant shelter may further comprise at least one of an ultraviolet stabilizer, a waterproofing additive, an extending filler, a prodegradant agent, a reinforcing filler, an animal repellent, a fungal repellent, a bacterial repellent, or any combination thereof. In accordance with certain embodiments of the invention, the waterproofing additive may comprise at least one of a polyhydrogenomethylsiloxane, a silane, or any combination thereof. In accordance with certain embodiments of the invention, the extending filler may comprise at least one of a wood flour filler, an olive stones powder filler, a wheat straw flour filler, a rice hull ash filler, or any combination thereof. In further embodiments of the invention, the reinforcing filler may comprise at least one of a waste paper sludge filler, a wood fiber filler, a jute filler, a flax filler, a hemp filler, a straw filler, a calcium carbonate filler, or any combination thereof. In an example embodiment of the invention, the plant shelter may comprise a plurality of wood medium density fibers in a polylactide matrix covered with a polylactide film. In accordance with certain embodiments of the invention, the outer wall and/or the inner wall (or portions thereof) may comprise a mesh. In such embodiments of the invention, the mesh may comprise a polymer-coated biocomposite mesh.

In accordance with certain embodiments of the invention, the plant shelter may comprise an extruded plastic component. In accordance with certain embodiments of the invention, the plant shelter may comprise a unitary structure in which the outer wass, the inner wall, and the plurality of segmented annular divider walls are formed as a single piece (e.g., devoid of any attachment articles such as screws, bolts, clips or the like). In accordance with certain embodiments of the invention, the plant shelter may comprise an extruded wrap-type plant shelter (e.g., self-wrapping plant shelter) comprising a polymeric component including at least one white pigment blended in with the polymeric component before or during extrusion. In this regard, the plant shelter may be formed from an extrusion process.

In another aspect, the invention provides a method of protecting a plant, such as a young tree. In accordance with certain embodiments of the invention, the method may comprise surrounding the plant or a portion of the plant with a shelter as disclosed herein. In accordance with certain embodiments of the invention, the method may further comprise inserting one or more retaining structures through one or more through channels of the plant shelter and engaging the ground underneath the plant shelter to provide additional anchoring to the plant shelter positioned about a young plant to be protected. Additionally or alternatively, the method may comprise positioning an external strap or band comprising a flexible and/or elastic material about the external surface of the plant shelter to provide additional support without negatively impacting the expandable nature of the plant shelter in accordance with certain embodiments of the invention.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A shelter, comprising:
a longitudinal tubular structure having a top edge and a bottom edge, wherein the longitudinal tubular structure is formed from a polymeric material including a pigment blended with the polymeric material, wherein the longitudinal tubular structure comprises a twin-walled structure comprising (i) an outer wall formed from the polymeric material, (ii) an inner wall formed from the polymeric material and located within the outer wall, and (iii) a segmented annular portion positioned between the outer wall and the inner wall, the segmented annular portion comprises a plurality of segmented annular divider walls formed from the polymeric material and defining a plurality of through channels extending from the top edge to the bottom edge; and
a conduit defined by the longitudinal tubular structure, the conduit extending from the top edge to the bottom edge;
wherein the polymeric material including the pigment blocks (i) from about 80% to about 100% of ultraviolet-B radiation (UV-B), wherein UV-B radiation is electromagnetic radiation across wavelengths 280 nm to 315 nm, and wherein the shelter is a unitary structure, and (ii) at least about 50% of visible light across all wavelengths from 390 nm to 780 nm.

2. The shelter of claim 1, wherein the polymeric material including the pigment reflects at least about 40% of electromagnetic radiation across all wavelengths from about 390 nm to about 2100 nm.

3. The shelter of claim 1, further comprising a percent-reflectance-to-percent-absorption ratio from about 10:1 to about 70:1, of electromagnetic radiation across all wavelengths from about 500 nm to about 1100 nm.

4. The shelter of claim 1, wherein the pigment comprises an antimony pigment, a barium pigment, a titanium pigment, a lead pigment, a zinc pigment, or any combination thereof.

5. The shelter of claim 4, where the antimony pigment comprises Stibous Oxide ($Sb_2O_3$), the barium pigment comprises barium sulfate ($BaSO_4$) or lithopone ($BaSO_4*ZnS$), the titanium pigments comprises titanic dioxide ($TiO_2$), the lead pigment comprises plumbous carbonate ($(PbCO_3)_2 \cdot Pb(OH)_2$), and the zinc pigment comprises zinc oxide ($ZnO$).

6. The shelter of claim 1, wherein the longitudinal tubular structure comprises a self-wrapping structure configured to roll upon itself to define the longitudinal structure in the absence of an external pressure.

7. The shelter of claim 6, wherein the longitudinal tubular structure comprises a first-side-edge extending from the top edge to the bottom edge and a second-side edge extending from the top edge to the bottom edge, and wherein the first-side-edge, second-side-edge, top edge and bottom edge define a body area, and wherein the first-side-edge and the second-side-edge are positioned relative to each other to define an overlapping section of the body area.

8. The shelter of claim 7, wherein the first-side-edge, the second-side-edge, or both are free to move relative to each other and such that upon growth of an encircled plant the overlapping section of the body area reduces in size.

9. The shelter of claim 1, wherein one or more of the plurality of through channels are configured to receive at least one retaining structure.

10. The shelter of claim 1, wherein the polymeric material comprises at least one of a synthetic polymer, a biodegradable polymer, a biocomposite, or any combination thereof.

11. The shelter of claim 10, wherein the synthetic polymer comprises at least one of a polyethylene, a polypropylene, a partially aromatic polyester, a fully aromatic polyester, a polyhexamethylene diadipamide, a polycaprolactam, an aromatic polyamide, a partially aromatic polyamide, an aliphatic polyamide, or any combination thereof.

12. The shelter of claim 10, wherein the biodegradable polymer comprises at least one of a cellulose, a polylactic acid, a cellophane, a native starch, a thermoplastic starch, a polyhydroxy butyrate, a poly-hydroxybutyrate-co-b-hydroxy valerate, a polyglycolic acid, a polycaprolactone, a compostable bioplastic, a platinum-catalyzed silicone, a reclaimed potato starch resin, or any combination thereof.

13. The shelter of claim 10, further comprising at least one of an ultraviolet stabilizer, a waterproofing additive, an extending filler, a prodegradant agent, a reinforcing filler, an animal repellent, a fungal repellent, a bacterial repellent, or any combination thereof.

14. A method of protecting a plant, comprising:
(a) providing a shelter comprising (i) a longitudinal tubular structure having a top edge and a bottom edge, wherein the longitudinal tubular structure is formed from a polymeric material including a pigment blended with the polymeric material, and (ii) a conduit defined by the longitudinal tubular structure, the conduit extending from the top edge to the bottom edge, wherein the polymeric material including the pigment blocks (a) from about 80% to about 100% of ultraviolet-B radiation (UV-B), wherein UV-B radiation is electromagnetic radiation across wavelengths 280 nm to 315 nm, and (b) at least about 50% of visible light across all wavelengths from 390 nm to 780 nm; and
(b) a step of surrounding the plant or a portion of the plant with the shelter
wherein the longitudinal tubular structure comprises a twin-walled structure comprising (i) an outer wall consisting of the polymeric material, (ii) an inner wall consisting of the polymeric material and located within the outer wall, and (iii) a segmented annular portion positioned between the outer wall and the inner wall, the segmented annular portion comprises a plurality of segmented annular divider walls consisting of the polymeric material and defining a plurality of through channels extending from the top edge to the bottom edge, and wherein the shelter is a unitary structure.

15. The method of claim 14, wherein the portion of the plant comprises a tree trunk.

16. The shelter of claim 1, wherein the polymeric material including the pigment blocks at least about 30% of electromagnetic radiation across all wavelengths from about 200 nm to about 2500 nm.

17. The method of claim 14, wherein the polymeric material including the pigment blocks at least about 30% of electromagnetic radiation across all wavelengths from about 200 nm to about 2500 nm.

* * * * *